United States Patent [19]

Wiker

[11] 4,376,170
[45] Mar. 8, 1983

[54] ZINC BOROSILICATE OPAL GLASSES

[75] Inventor: Richard M. Wiker, Painted Post, N.Y.

[73] Assignee: Corning Glass Works, Corning, N.Y.

[21] Appl. No.: 360,349

[22] Filed: Mar. 22, 1982

[51] Int. Cl.$^3$ ............................ C03C 3/08; C03C 3/30
[52] U.S. Cl. .......................................... 501/32; 501/65
[58] Field of Search .................................. 501/32, 65

[56] References Cited

U.S. PATENT DOCUMENTS

| | | | |
|---|---|---|---|
| 3,275,492 | 9/1966 | Herbert | 501/65 |
| 3,661,601 | 5/1972 | Dumbaugh et al. | 501/59 |
| 3,723,144 | 3/1973 | Flannery et al. | 501/65 |
| 3,728,139 | 4/1973 | Carrier et al. | 501/67 |

*Primary Examiner*—Mark Bell
*Attorney, Agent, or Firm*—Clinton S. Janes, Jr.

[57] ABSTRACT

This invention is directed to the production of spontaneous opal glasses which demonstrate good microwave compatibility and dense opacity when drawn as sheet. The glasses consist essentially, analyzed in weight percent of

| | |
|---|---|
| $Na_2O$ | 2.8 ± 0.2 |
| $ZnO$ | 9.4 ± 0.6 |
| $B_2O_3$ | 12.9 ± 0.5 |
| $TiO_2$ | 0.8 ± 0.2 |
| $SiO_2$ | Remainder |

2 Claims, No Drawings

ZINC BOROSILICATE OPAL GLASSES

BACKGROUND OF THE INVENTION

Opal glasses have been produced for many years and have been used extensively in such applications as baking ware, lamp globes, and tableware. The mechanism giving rise to the opacity in such glasses is the presence of a second phase therewithin, this second phase, whether it be amorphous, crystalline, or simply voids, having an index of refraction different from that of the matrix glass.

Opal glasses have been generally categorized into two broad groupings; viz., spontaneous opals and thermally opacifiable opals. The former type develops opacity ("strikes in") as the molten glass is cooled to a solid body whereas the latter, frequently termed a reheat opal, contemplates cooling the molten glass to a solid body and thereafter heat treating that body to effect opacity therein. It will be apparent that, from the standpoint of cost of manufacture, spontaneously opacifiable glasses are preferred over glasses requiring a subsequent heat treatment.

Two classes of spontaneous opals are known to the art; viz., those wherein the opacifying phase is a crystal and those characterized by the separation of a glassy phase having a composition different from that of the parent glass and which is insoluble in the parent glass.

Borosilicate-type glasses typically exhibit relatively low coefficients of thermal expansion ($25$–$50 \times 10^{-7}$ over the range of $0°$–$300°$ C.) and, hence, demonstrate good resistance to thermal shock. This property has recommended their utility in applications where the glasses will be exposed to elevated temperatures, e.g., culinary ware.

U.S. Pat. No. 3,275,492 discloses alkali metal borosilicate opal glasses wherein the opacity may be developed spontaneously or upon reheating the glass body, the opacity resulting from the separation of an immiscible glassy phase. The glasses are stated to consist essentially, expressed in terms of mole percent on the oxide basis, of

| | | |
|---|---|---|
| $SiO_2$ | 66–81 | (equivalent to 62–72% by weight) |
| $B_2O_3$ | 10–27 | (equivalent to 12–30% by weight) |
| $Li_2O$ and/or $Na_2O$ and/or $K_2O$ | 1–7 | | to which 3–34% of an opacifying agent is added selected from the group of BaO, CaO, CoO, CuO, MgO, NiO, and ZnO.

U.S. Pat. No. 3,661,601 also describes borosilicate-based, spontaneous opal glasses wherein the separation of an amorphous phase provides the desired opacity. The glasses consisted essentially, in weight percent, of:

| | |
|---|---|
| $SiO_2$ | 50–75 |
| $Al_2O_3$ | 3–9 |
| CaO | 11–20 |
| $B_2O_3$ | 1–7 |
| F | 2–4 |
| $Na_2O$ | 0–7 |
| $K_2O$ | 0–7 |
| $Na_2O + K_2O$ | 3–10 |
| BaO and/or SrO and/or $P_2O_5$ and/or $La_2O_3$ and/or $TiO_2$ and/or $Nb_2O_5$ and/or ZnO and/or $GeO_2$ and/or PbO and/or $Bi_2O_3$ and/or $CeO_2$ | 0–10 |

U.S. Pat. No. 3,723,144 discloses another borosilicate-based, spontaneous opal glass wherein opacity results from the separation of an immiscible glassy phase. Those glasses consisted essentially, in weight percent, of:

| | |
|---|---|
| $Li_2O$ | 0.5–2.5 |
| ZnO | 7–10 |
| $B_2O_3$ | 11–14 |
| $SiO_2$ | 71–76 |
| $Na_2O$ | 0–0.5 |
| $K_2O$ | 0–3 |
| $Al_2O_3$ | 0–1.5 |

U.S. Pat. No. 3,728,139 describes yet another borosilicate-based, spontaneous opal glass wherein opacity is provided by means of the separation of an immiscible amorphous phase. Those glasses consisted essentially, in weight percent, of:

| | |
|---|---|
| $SiO_2$ | 72–76 |
| $B_2O_3$ | 9–14 |
| $Al_2O_3$ | 0–1.5 |
| $Li_2O$ and/or $Na_2O$ and/or $K_2O$ | 1–6 |
| CaO and/or MgO and/or ZnO | 3–9 |
| $ZrO_2$ | 0–0.5 |
| $TiO_2$ | 0.5–2.0 |
| $MoO_3$ and/or $WO_3$ and/or $As_2O_3$ | 1–3 |

One application for which a borosilicate-based opal glass would be extremely useful is as a shelf in a microwave oven. Thus, the low coefficient of thermal expansion of the material would essentially eliminate concern regarding breakage resulting from thermal shock. To preclude undesirable heatup of the shelf during exposure to microwave, the alkali metal content of the composition will preferably be held at a low level.

There are numerous known methods for drawing glass sheet from a melt wherein the glass sheet does not come into contact with a mold or rollers until it has cooled sufficiently to resist surface marking. U.S. Pat. Nos. 3,338,696 and 3,682,609 disclose downdraw processes wherein careful control can be had in forming glass sheet of very uniform thickness and of optical quality.

Those processes, however, contemplate maintaining large volumes of glass at relatively low temperatures to obtain acceptable sheet-forming viscosities in the $10^4$–$10^6$ poise range. The molten glass will also be in long term contact with the refractory metals or ceramics which act as forming elements for the drawn sheet. Accordingly, those sheet-forming processes impose severe constraints upon operable glass compositions due to the glass stability and liquidus problems inherently associated with the handling and forming of molten glass at relatively low temperatures.

In summary, for utility in those sheet-forming processes, the glass must demonstrate a viscosity at the liquidus temperature of at least $10^4$ poises and, preferably, about $10^5$ poises and higher. Moreover, the glass melt must display extended stability against devitrification and interfacial crystallization in contact with refractory metals and ceramics such as platinum, sillimanite, mullite, zircon, and high density, alumina-containing refractories which have been used to contain and/or form molten glass. This stability must be maintained down to temperatures where the glass manifests a viscosity between about $10^4$–$10^6$ poises, the range of viscosities at which the glass is customarily drawn.

Finally, of course, to produce an opal glass wherein the opacity is of a uniform density, the opacifying phase must strike in very rapidly as the sheet is being drawn from the molten glass.

Therefore, the primary objective of the instant invention is to produce a spontaneous opal glass of dense opacity having a composition within the borosilicate system, which glass demonstrates a relatively low coefficient of thermal expansion, preferably less than $35 \times 10^{-7}/°C$., and the capability of being used in elevated temperature applications, i.e., having a strain point in excess of 560° C., the composition being low in alkali metal content such as to permit its use in microwave applications, and exhibiting the necessary stability and viscosity characteristics for drawing sheet in the downdraw processes described in U.S. Pat. Nos. 3,338,696 and 3,682,609, supra.

SUMMARY OF THE INVENTION

That objective can be accomplished in glasses falling within a very narrowly-defined region of compositions within the $Na_2O$—$ZnO$—$B_2O_3$—$TiO_2$—$SiO_2$ system. Hence, glasses satisfying the above-outlined criteria will consist essentially, as analyzed in terms of weight percent on the oxide basis, of

| | |
|---|---|
| $Na_2O$ | 2.8 ± 0.2 |
| ZnO | 9.4 ± 0.6 |
| $B_2O_3$ | 12.9 ± 0.5 |
| $TiO_2$ | 0.8 ± 0.2 |
| $SiO_2$ | Remainder (~73.0 ± 2.0) |

Preferably, the composition will be composed solely of those five components with the total of all extraneous oxides not exceeding about 2%, including conventional glass colorants. $Al_2O_3$ appears to retard the desired spontaneous opalization and, therefore, will desirably be virtually entirely absent from the composition. Most preferably, the $Na_2O$ level (and the total alkali metal oxide content, if other alkali metal oxides are present with $Na_2O$) will be maintained below about 3% to insure good microwave compatibility of the glass. Consequently, the $Na_2O$, ZnO, $B_2O_3$, and $TiO_2$ values must be carefully balanced to achieve the necessary viscosity relationships for downdraw sheet forming. A minimum of at least 8.7% ZnO is required to induce sufficiently rapid spontaneous opalization of the glass as it is drawn into sheet to impart dense opacity thereto. Quantities of ZnO above about 10%, however, add unnecessary cost to the glass batch and also cause the liquidus temperature to rise with consequent hazarding of devitrification problems. $TiO_2$ behaves as a flux in the inventive compositions and also imparts a warm white color to the glass by providing a slight yellowish tint thereto. As is quite frequent with borosilicate-based glasses, the inventive compositions can be chloride-fined.

PRIOR ART

U.S. Pat. No. 3,275,492, discussed above, discloses spontaneous opal glasses within the alkali metal oxide–ZnO—$B_2O_3$—$SiO_2$ field, but does not teach the need for compositions for satisfying the criteria demanded for downdraw sheet making while insuring dense opacity. Moreover, nowhere is there any mention of $TiO_2$ and the utility that component brings to the inventive glasses.

DESCRIPTION OF PREFERRED EMBODIMENTS

A batch for a glass having the approximate composition tabulated below, expressed in terms of parts by weight on the oxide basis, was compounded. The actual batch ingredients may consist of any materials, either the oxide or other compound, which, when melted together, will be converted into the desired oxide in the proper proportions. Because the sum of the individual constituents closely approximates 100, for all practical purposes the values presented may be deemed to reflect weight percent.

| | |
|---|---|
| $SiO_2$ | 73.4 |
| $Na_2O$ | 2.87 |
| $B_2O_3$ | 13.11 |
| $TiO_2$ | 0.87 |
| ZnO | 9.67 |

The batch (chloride-fined) was fed into a commercial glass melting tank equipped with downdraw apparatus for forming sheet. Glass sheet about 73–75" wide and a thickness of about 5/32–7/32" was continuously drawn. Sheet of good quality was produced which exhibited very dense opacity. Glass instability (devitrification) was not a problem. A liquidus temperature of about 950° C. was measured on the glass and the viscosity at that temperature was about $8 \times 10^6$ poises. The glass exhibited a coefficient of thermal expansion (0°–300° C.) of about $29.6 \times 10^{-7}/°C.$, a softening point of about 903° C., an annealing point of 621° C., and a strain point of about 575° C.

Analyses of the $Na_2O$, ZnO, $B_2O_3$, $TiO_2$, and $Al_2O_3$ contents of the opalized glass determined the following values in weight percent:

| | |
|---|---|
| $Na_2O$ | 2.94 |
| ZnO | 9.76 |
| $B_2O_3$ | 12.87 |
| $TiO_2$ | 0.73 |
| $Al_2O_3$ | 0.17 |

$Al_2O_3$ is an unwanted impurity in the glass.

To explore the effect of ZnO, lower levels thereof were utilized in the same base composition. At values below about 8.7% ZnO, the opacity produced in the drawn sheet was not as dense as was desired. A reheating step was necessary to enhance the opacity.

To investigate the microwave compatibility of the material, i.e., the degree to which the material will heat up when exposed to microwave radiation, a sheet segment was subjected to the following test:

Two pieces of the opalized glass sheet are stacked one atop the other with a fine wire thermocouple inserted therebetween. The stack is placed within a box fabricated from fused silica and the box introduced into a microwave oven having an output of 1300 watts. A glass beaker containing about 700 ml water was also placed in the oven to provide a load. The oven was then actuated at the highest output and, after a period of three minutes, the rise in temperature evidenced by the thermocouple is observed. The temperature of the sheet stack rose only 8° C.

The most preferred compositions will consist essentially, as analyzed in terms of weight percent on the oxide basis, of

|  |  |
|---|---|
| $Na_2O$ | 2.85 ± 0.1 |
| ZnO | 9.75 ± 0.2 |
| $B_2O_3$ | 12.85 ± 0.2 |
| $TiO_2$ | 0.85 ± 0.05 |
| $SiO_2$ | Remainder |

The $Al_2O_3$ content will not exceed 0.3%.

I claim:

1. A spontaneous opal glass which exhibits a coefficient of thermal expansion (0°–300° C.) of less than $35 \times 10^{-7}$/°C., a strain point in excess of 560° C., good microwave compatibility, and dense opacity when formed into sheet consisting essentially, analyzed in terms of weight percent on the oxide basis, of

|  |  |
|---|---|
| $Na_2O$ | 2.8 ± 0.2 |
| ZnO | 9.4 ± 0.6 |
| $B_2O_3$ | 12.9 ± 0.5 |
| $TiO_2$ | 0.8 ± 0.2 |
| $SiO_2$ | Remainder |

2. A spontaneous opal glass according to claim 1 consisting essentially, analyzed in terms of weight percent on the oxide basis, of

|  |  |
|---|---|
| $Na_2O$ | 2.85 ± 0.1 |
| ZnO | 9.75 ± 0.2 |
| $B_2O_3$ | 12.85 ± 0.2 |
| $TiO_2$ | 0.85 ± 0.05 |
| $SiO_2$ | Remainder |

* * * * *